US012181391B2

(12) United States Patent
Park et al.

(10) Patent No.: US 12,181,391 B2
(45) Date of Patent: Dec. 31, 2024

(54) SAMPLE DILUTING AND DISPENSING DEVICE FOR ICP-AES ANALYSIS

(71) Applicant: KOREA INSTITUTE OF GEOSCIENCE AND MINERAL RESOURCES (KIGAM), Daejeon (KR)

(72) Inventors: Jung Hun Park, Daejeon (KR); Gyujun Park, Daejeon (KR); Min Jung Park, Daejeon (KR)

(73) Assignee: KOREA INSTITUTE OF GEOSCIENCE AND MINERAL RESOURCES (KIGAM), Daejeon (KR)

( * ) Notice: Subject to any disclaimer, the term of this patent is extended or adjusted under 35 U.S.C. 154(b) by 376 days.

(21) Appl. No.: 17/506,979

(22) Filed: Oct. 21, 2021

(65) Prior Publication Data

US 2022/0120647 A1    Apr. 21, 2022

(30) Foreign Application Priority Data

Oct. 21, 2020 (KR) ........................ 10-2020-0136738

(51) Int. Cl.
*G01N 1/38* (2006.01)
*G01G 13/04* (2006.01)
*G01N 35/04* (2006.01)
*G01N 35/10* (2006.01)

(52) U.S. Cl.
CPC ............... *G01N 1/38* (2013.01); *G01G 13/04* (2013.01); *G01N 35/1016* (2013.01); *G01N 2035/0498* (2013.01); *G01N 2035/1051* (2013.01)

(58) Field of Classification Search
CPC ............... G01N 1/38; G01N 35/1016; G01N 2035/0498; G01N 2035/1051; G01G 13/04
See application file for complete search history.

(56) References Cited

U.S. PATENT DOCUMENTS

| | | | |
|---|---|---|---|
| 8,609,040 B2* | 12/2013 | Brown | G01N 21/6486 422/68.1 |
| 11,710,640 B2* | 7/2023 | Uhlmeyer | G01N 1/2035 73/863 |
| 11,726,028 B2* | 8/2023 | Yoshimura | G01N 35/026 73/864.81 |

(Continued)

FOREIGN PATENT DOCUMENTS

| | | |
|---|---|---|
| KR | 20-1997-0045193 U | 7/1997 |
| WO | 2019/138720 A1 | 7/2019 |

*Primary Examiner* — Kristina M Deherrera
*Assistant Examiner* — Jean F Morello
(74) *Attorney, Agent, or Firm* — Hauptman Ham, LLP (57) ABSTRACT

The present invention relates to a sample diluting and dispensing device. The sample diluting and dispensing device according to the present invention includes: a sample holding plate in which a holding part for holding a plurality of sample vessels is formed; a moving unit for transferring the sample holding plate in a plane direction and a height direction; a sample supply unit for supplying a sample to the sample vessel; a diluent supply unit for supplying a diluent to the sample vessel; a scale installed below the sample holding plate to measure a weight of the sample vessel; and a controller for receiving a weight measurement result from the scale and controlling an operation of each of the sample holding plate, the sample supply unit, and the diluent supply unit.

10 Claims, 6 Drawing Sheets

(56) References Cited

U.S. PATENT DOCUMENTS

2014/0083175 A1\* 3/2014 Geach ................ G01N 15/0205
  73/61.71
2019/0041415 A1\* 2/2019 Nonaka .............. G01N 35/1002
2020/0209273 A1\* 7/2020 Ota .................... G01N 35/1011

\* cited by examiner

SAMPLE DILUTING AND DISPENSING DEVICE FOR ICP-AES ANALYSIS

CROSS-REFERENCE TO RELATED APPLICATIONS

This U.S. non-provisional patent application claims priority under 35 U.S.C. § 119 of Korean Patent Application No. 10-2020-0136738, filed on Oct. 21, 2020, the entire contents of which are hereby incorporated by reference.

BACKGROUND

The present invention relates to a pre-processing device for preparing a sample appropriately for an ICP-AES analysis.

The inductively coupled plasma atomic emission spectroscopy (ICP-AES) is a method for analyzing the kind and content of elements contained in a sample by measuring an intensity for each wavelength band of light when a sample solution is injected to a plasma light source.

In order to use an ICP-AES analyzer, the sample is required to be liquefied, and a concentration of the sample is also required to be matched with a predetermined condition (several % range of several ppm). To this end, a concentration of the sample in the solution is appropriately adjusted by mixing nitric acid to the sample to melt impurities in the sample or mixing nitric acid to the sample to dilute the sample.

Typically, a pre-processing is performed on the sample by inputting the sample in a graduated vial and injecting nitric acid using a pipette or a syringe. This operation is generally performed by a person or partially performed by using an automation device. Here, a limitation is that dilution is performed based on a volume. Since a volume of liquid is changed according to a surrounding temperature, when dilution is performed based on the volume, a concentration condition of the sample may not be exactly adjusted.

Also, the sample is generally divided into a plurality of vials to make a plurality of sample sets for the ICP-AES analysis. That is, dispensing of the sample is required. Since a dispensing work and a dilution work is generally separately and manually performed, the sample analysis may not be quickly performed.

SUMMARY

The present invention provides a sample diluting and dispensing device capable of automatically diluting and dispensing a sample, and particularly diluting a sample based on a mass.

The object of the present invention is not limited to the aforesaid, but other objects not described herein will be clearly understood by those skilled in the art from descriptions below.

The present invention provides a sample diluting and dispensing device including: a sample holding plate in which a holding part configured to hold a plurality of sample vessels is formed; a moving unit configured to transfer the sample holding plate in a plane direction and a height direction; a sample supply unit configured to supply a sample to the sample vessel; a diluent supply unit configured to supply a diluent to the sample vessel; a scale installed below the sample holding plate to measure a weight of the sample vessel; and a controller configured to receive a weight measurement result from the scale and control an operation of each of the sample holding plate, the sample supply unit, and the diluent supply unit.

In an embodiment of the present invention, a plurality of through-holes may be formed in the holding part of the sample holding plate, the sample diluting and dispensing device may further include a holding vessel configured to accommodate the sample vessel, the holding vessel inserted to and held by the through-hole, and a protruding part that protrudes from an outer circumferential surface of the holding vessel and caught and held by an outer portion of the through-hole when the holding vessel is inserted to the through-hole may be formed.

In an embodiment of the present invention, the holding vessel may have a flat bottom surface to stand itself when supported by the scale. More particularly, when the sample holding plate descends, the holding vessel may be supported by the scale to stand itself on the scale instead of being supported by the sample holding plate, and thus a weight of the holding vessel may be measured. The scale may include a scale main body and a support block installed on the scale main body and having a flat top surface to support the holding vessel.

In an embodiment of the present invention, each of the sample supply unit and the diluent supply unit may include: a storage part configured to store the sample or the diluent; an injection part configured to inject the sample or the diluent of the storage part into the sample vessel and move between a standby position and an injection position for injecting the sample; and a pump configured to transfer the sample or the diluent of the storage part to the injection part.

Here, the pump may be a peristatic pump, and the sample diluting and dispensing device may further include a transfer tube configured to connect the storage part and the injection part, the transfer tube inserted to the peristatic pump.

In an embodiment of the present invention, the controller may control the sample diluting and dispensing device to perform: transferring the sample holding plate in the plane direction and the height direction, so that one of the plurality of sample vessels is supported on the scale; supplying a predetermined amount (mass) of the sample from the sample supply unit to the sample vessel while continuously measuring a weight by the scale; and supplying a predetermined amount (mass) of the diluent from the diluent supply unit to the sample vessel while continuously measuring a weight by the scale. Also, the controller may perform a pre-processing on a plurality of samples by sequentially allowing the plurality of sample vessels to be supported on the scale and supplying the sample and the diluent.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

The attached drawings are presented for purposes of explanation only, and the technical scope of the present invention is not limited thereto.

DETAILED DESCRIPTION

Hereinafter, detailed descriptions related to well-known functions or configurations will be ruled out in order not to unnecessarily obscure subject matters of the present invention.

The present invention relates to a sample diluting and dispensing device. That is, the device according to the present invention mixes a liquid sample with a diluent to produce a sample appropriate for an analysis, and also produces a plurality of sample sets instead of producing one sample. The present invention is characterized in that diluting and dispensing are automatically performed by one device.

Although the sample obtained by mixing the liquid sample and the diluent for an ICP-AES analysis is generally a main object, the present invention is not limited thereto. For example, the present invention may be applied to all samples prepared by mixing two or more liquids.

Hereinafter, a sample diluting and dispensing device according to an embodiment of the present invention will be described in more detail with reference to the accompanying drawings.

Figure 1:
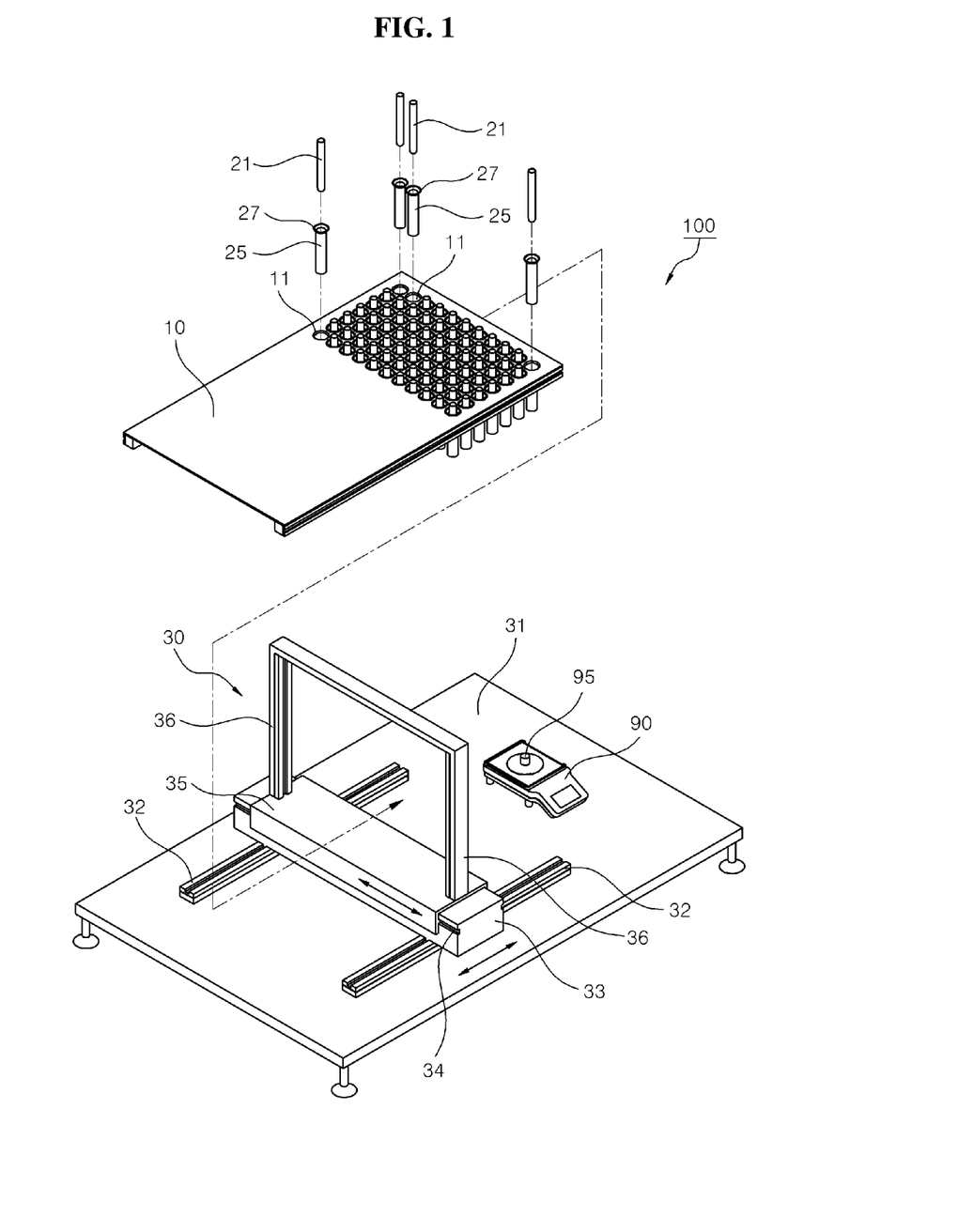
FIG. 1 is a schematic exploded perspective view illustrating a main portion of a sample diluting and dispensing device according to an embodiment of the present invention.
Figure 2:
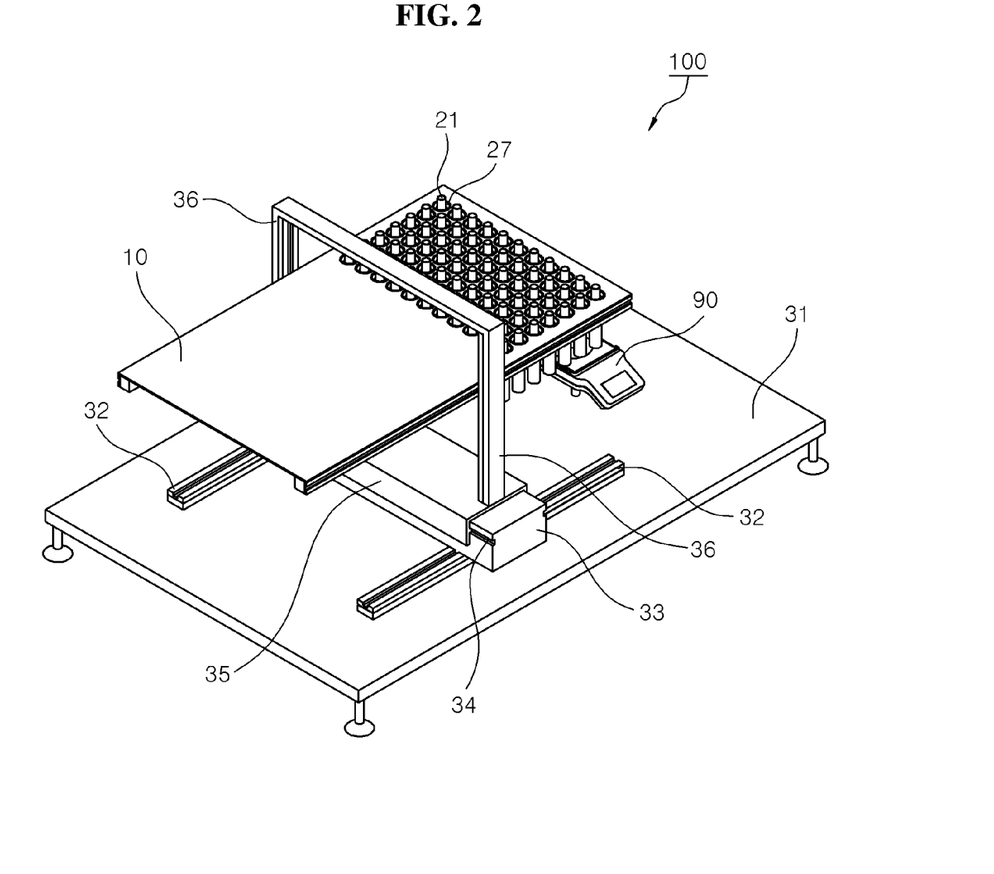
FIG. 2 is a schematic perspective view illustrating a state in which a sample holding plate is coupled to a state of FIG. 1.
Figure 3:
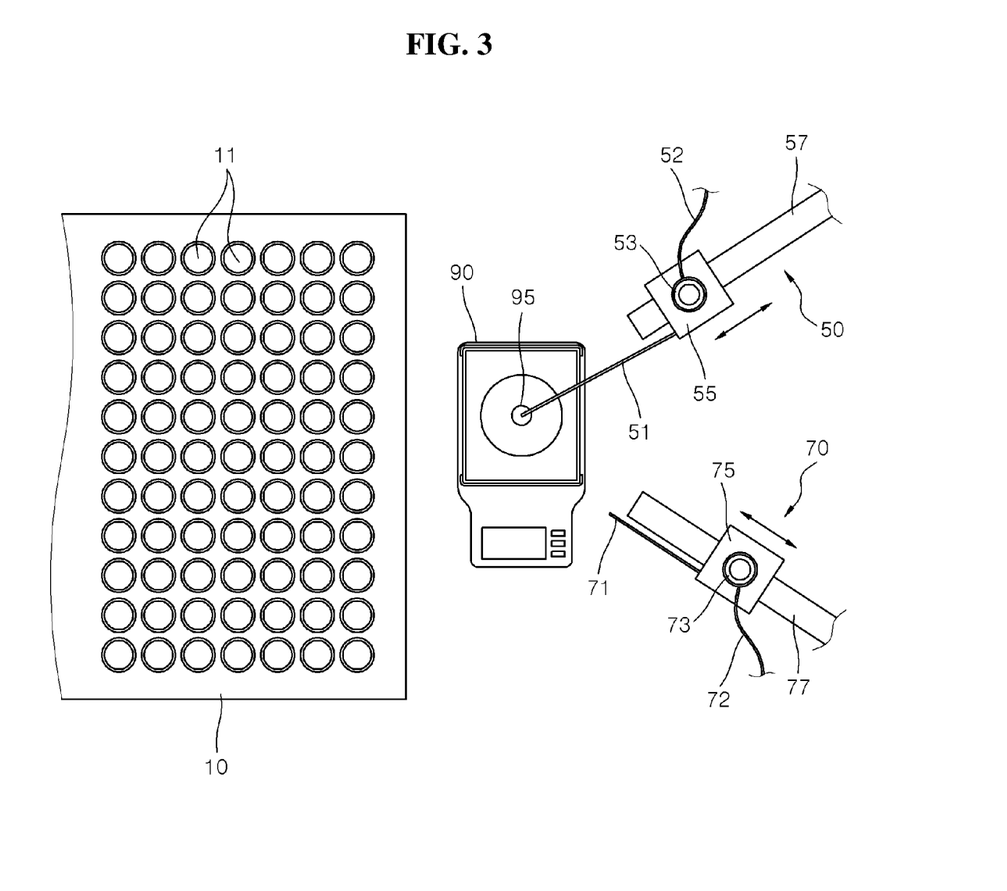
FIG. 3 is a schematic plan view for explaining a sample supply unit and a diluent supply unit.

FIG. 1 is a schematic exploded perspective view illustrating a main portion of the sample diluting and dispensing device according to an embodiment of the present invention, FIG. 2 is a schematic perspective view illustrating a state in which a sample holding plate is coupled to a state of FIG. 1, and FIG. 3 is a schematic plan view for explaining a sample supply unit and a diluent supply unit.

Referring to the drawing, a sample diluting and dispensing device 100 according to an embodiment of the present invention includes a sample holding plate 10, a moving unit 30, a sample supply unit 50, a diluent supply unit 70, a scale 90, and a controller (not shown).

Firstly, the moving unit 30 will be described.

The moving unit 30 transfers the sample holding plate 10 that will be described later in a plane direction and a vertical direction (or perpendicular vertical direction). The moving unit 30 may adopt a mechanical unit allowing a three-dimensional (3D) movement of the sample holding plate 10 as described above.

In this embodiment, a rail and a motor are used as the moving unit 30. One pair of first rails 32 are installed on a base frame 31 along an X-axis direction. A first moving body 33 is installed on the first rail 32 and movable to both sides along the first rail 32 by driving of a motor (not shown). The first moving body 33 is lengthily formed along a Y-axis perpendicular to the X-axis, and one pair of second rails 34 are installed on both side surfaces of the first moving body 33 along the Y-axis. The first rail 32 and the second rail 34 are disposed along the X-axis and the Y-axis, respectively, to cross each other. A second moving body 35 is installed on the first moving body 33. As a bent portion that is bent downward perpendicularly is disposed at each of both sides of the second moving body 35 and inserted to the second rail 34, the second moving body 35 may move to both sides in a Y-axis direction along the second rail 34 by an operation of the motor (not shown). One pair of frames 36 are installed at both ends of the second moving body 35. The sample holding plate 10 that will be described later may be installed between the one pair of frames 36 and move in the vertical direction by the motor (not shown). The above-described mechanical constitution of the moving unit 30 is merely an example, and the present invention may adopt various mechanical constitutions capable of transferring the sample holding plate 10 in the plane direction and the vertical direction.

The sample holding plate 10 serves to hold a plurality of sample vessels and has a flat plate shape. The sample holding plate 10 may be installed between the one pair of vertical frames 36 to move in the vertical direction and the plane direction. A holding part for holding the sample vessel is formed in the sample holding plate 10. In this embodiment, the holding part is a plurality of through-holes 11 formed in the sample holding plate 10, and the sample vessel is inserted to each of the through-holes 11. Alternatively, for another embodiment, the holding part have a different shape instead of the through-hole may be used. Also, in this embodiment, the through-holes 11 are biased to one side of the sample holding plate 10. Thus, since a weight may be biased to one side to lose a left-right balance, a weight pendulum (not shown) may be installed at the other side of the sample holding plate 10. However, this is merely an example, and the position of the holding part may be variously changed. For example, the through-hole may be formed in a central portion of the sample holding plate.

Figure 4:
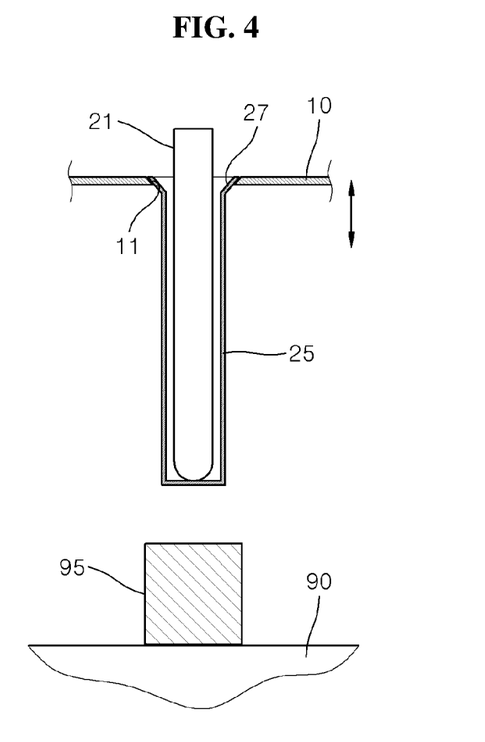
FIG. 4 is a schematic longitudinal cross-sectional view for explaining a state in which a holding vessel and a sample vessel are inserted to the sample holding plate.

A vessel for holding a sample includes a sample vessel 21 and a holding vessel 25. In general, the sample vessel 21 may use a plastic vial for accommodating a sample. In this embodiment, the vial sample vessel 21 is held by being inserted to a separate holding vessel 25 instead of directly holding the vial sample vessel 21 by the sample holding plate 10. The holding vessel 25 has a bottom surface that is blocked with a flat shape and accommodates the sample vessel 21 therein. As a flange part 27 having a diameter greater than that of the through-hole 11 is formed on an upper outer circumferential surface of the holding vessel 25, when the holding vessel 25 is inserted to the through-hole 11, an upper portion of the holding vessel 25 is caught, so that the holding vessel 25 does not fall down. Although the flange part has a ring shape in this embodiment, the holding vessel may be held at the through-hole by a plurality of protruding portions that protrude from an outer circumferential surface of the holding vessel in another embodiment. In this embodiment, it is important that the holding vessel 25 may stand itself because of the flat bottom surface thereof. That is, since a typical vial sample vessel may not stand itself due to a rounded curved bottom surface thereof, the holding vessel 25 capable of standing itself is separately used in this embodiment. The reason to use the separate holding vessel 25 will be described later again. However, when the sample vessel 21 has a flat bottom surface to stand itself as in another embodiment of the present invention, only the sample vessel may be used instead of using the separate holding vessel. In this case, a protruding portion may be formed on the sample vessel, so that the sample vessel is held by the through-hole.

The sample supply unit 50 serves to inject the liquid sample to the sample vessel 21 and includes a storage part (not shown) for storing the sample and an injection part 51 for injecting the sample to the sample vessel 21. In this embodiment, the storage part is a relatively big storage container containing the liquid sample to be supplied from a plurality of sample vessels 21. The storage container is connected with one end of a transfer tube 52. Also, the injection part 51 is connected to the other end of the transfer tube 52. In this embodiment, a probe having an inner diameter of about 1 mm is used as the injection part 51. The liquid sample in the storage container is transferred to the probe 51 through the transfer tube 52, and the sample discharged from the probe is injected to the sample vessel 21. A pump 53 for pumping the liquid sample from the storage container is installed on the transfer tube 52. In this embodiment, the pump 53 uses a peristatic pump, and the transfer tube uses a Teflon tube. When the transfer tube is inserted to the peristatic pump, the pump periodically compresses the transfer tube to perform pumping. As the peristatic pump is used, the liquid sample is not brought into direct contact with the pump. When the sample contacts the pump, the sample may be polluted to cause disruption in sample analysis. Thus, the liquid sample is not brought into direct contact with the pump.

Also, in an embodiment of the present invention, the injection part of the sample supply unit 50 may move between a standby position and an injection position. The injection position refers to a position when the sample is injected to the sample vessel 21, and the standby position refers to a position when the sample is not injected. Referring to FIG. 3, in this embodiment, the peristatic pump 53 and the probe 51 are installed on a moving block 55. Also, the moving block 55 may be installed on a guide rail 57 and move to both sides expressed by arrows (refer to FIG. 3) by driving of a motor (not shown). When the moving block 55 is disposed at one side of the guide rail 57, an end of the probe 51 is disposed on a central portion of the scale 90, and this position is the injection position. Also, all positions deviated from the injection position of the moving block 55 correspond to the standby position.

The diluent supply unit 70 serves to supply the diluent to the sample vessel 21. In this embodiment, the diluent supply unit 70 has the same constitution as the above-described sample supply unit 50. That is, the diluent supply unit 70 includes a storage part (not shown), an injection part 71, a peristatic pump 73, a moving block 75, and a guide rail 77, which is the same constitution with the same name of the sample supply unit 50. Also, the diluent supply unit 70 has the same feature related to the injection position and the standby position as those of the sample supply unit 50. That is, the probe 71 of the diluent supply unit 70 may be disposed on the central portion of the scale 90 at the injection position, and other positions correspond to the standby position. As described above, the diluent supply unit and the sample supply unit are the same as each other except that the materials accommodated in the storage parts are the sample and the diluent. A description on the constitution of the diluent supply unit will be substituted by the description of the sample supply unit. Although the diluent uses a nitric acid solution in this embodiment, other solutions such as different acid solutions, an alkali solution, and distilled water may be used.

The scale 90 is disposed below the sample holding plate 10 to measure weights of the sample and the diluent. In this embodiment, a separate support block 95 may be selectively installed on the scale 90.

The controller (not shown) continuously receives a measured value of the scale 90 in real time and controls operations of the moving unit 30, the sample supply unit 50, and the diluent supply unit 70. A computer with software capable of performing the above-described operations may be used as the controller.

Hereinafter, an operation of the sample diluting and dispensing device 100 according to control of the controller will be described.

Figure 6:
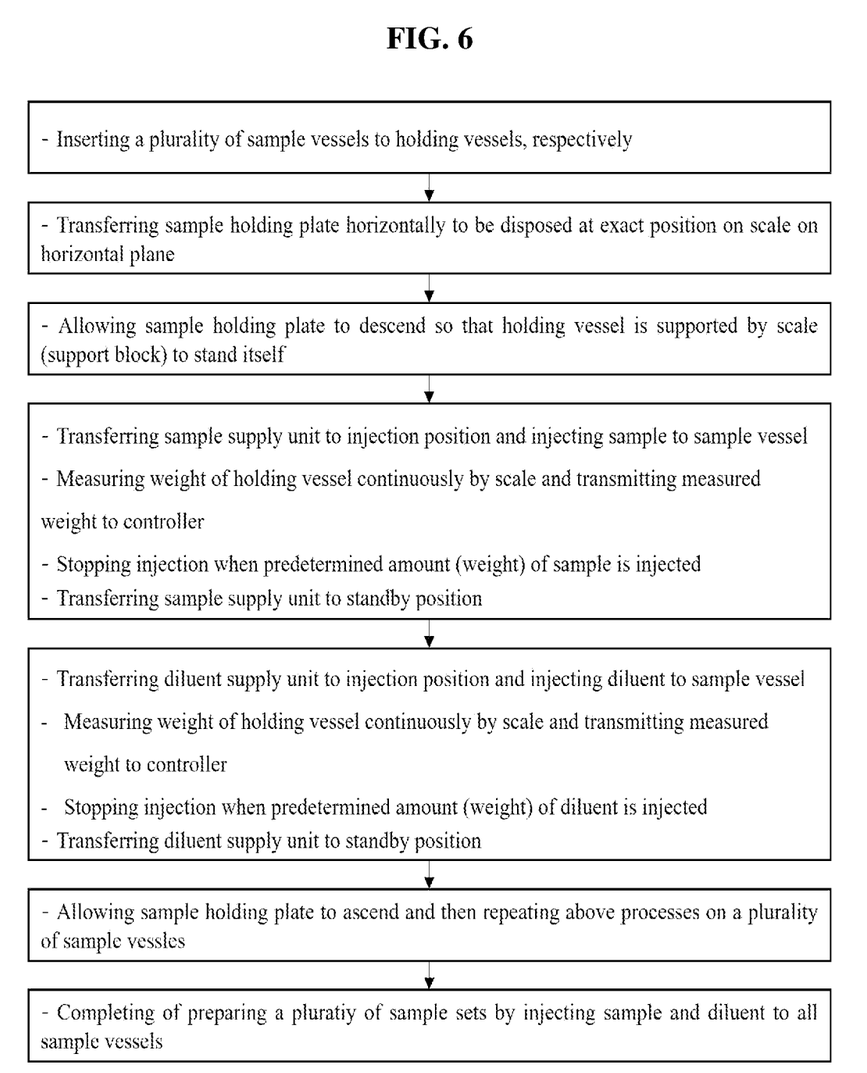
FIG. 6 is a schematic flowchart for explaining operation control of a controller in the sample diluting and dispensing device according to an embodiment of the present invention.

Referring to FIG. 6, in the device 100 according to the present invention, the plurality of sample vessels 21 are firstly inserted to the holding vessels 25, and then the holding vessels 25 are respectively held by the through-holes 11 of the sample holding plate 10. All of an initial position of the sample holding plate and coordinate values (X, Y, Z) of the plurality of sample vessels are recorded in the controller. The controller sequentially transfers each of the plurality of sample vessels to an exact position according to a predetermined order. The transferring of the sample vessel may be performed by controlling an operation of the moving unit. Here, the exact position refers to a specific position at which the sample vessel receives the sample and the diluent, which is the central portion of the scale 90 in the plane direction and a position at which the holding vessel stands on the scale in the vertical direction.

Figure 5:
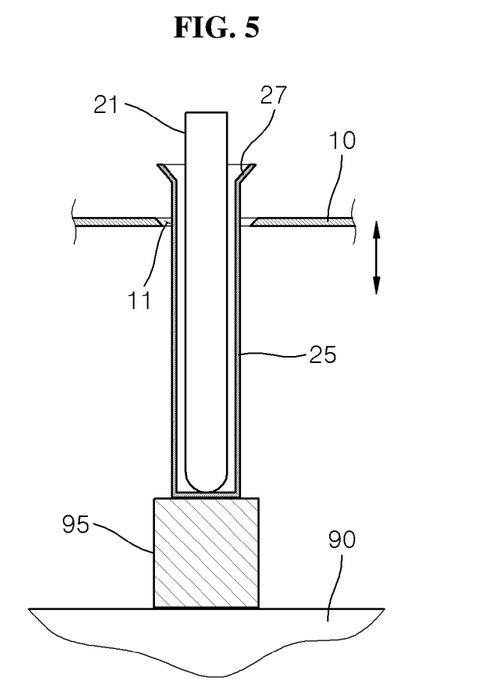
FIG. 5 is a schematic longitudinal cross-sectional view illustrating a state in which the holding vessel is supported by a scale as the sample holding plate descends from a state of FIG. 4.

That is, in this embodiment, when the sample holding plate 10 descends by the moving unit from a state of FIG. 4, in which the sample vessel is disposed at the central portion of the scale 90 in the plane direction, the holding vessel 25 is supported by the support block 95 of the scale 90 to stand itself as in FIG. 5. Since the holding vessel 25 has the flat bottom surface, the holding vessel 25 may stand itself instead of being supported by the sample holding plate. Here, the holding vessel 25 completely stands itself on the scale 90 or the support block 95 without contacting or being supported by the sample holding plate 10. Since the holding vessel 25 completely stands itself, a weight measured by the scale is a net weight of the holding vessel 25 and the sample vessel 21. When the holding vessel 25 is supported by the sample holding plate 10, a net weight of only the holding vessel and the sample vessel containing the sample may not be measured.

In the above-described state, the controller transfers the sample supply unit to the injection position and operates the pump to inject a predetermined amount of the liquid sample into the sample vessel 21. The scale 90 checks an injected amount of the sample by measuring a weight variation in real time while the sample is supplied. When the injection of the sample is completed, the controller transfers the sample supply unit to the standby position and transfers the diluent supply unit to the injection position. In the same manner as the above-described process, a weight is measured while a predetermined amount of the diluent is injected into the sample vessel. When a pre-processing is completed by injecting the predetermined amount of each of the sample and the diluent, the sample holding plate 10 ascends. Thereafter, the above-described processes are repeatedly performed on the plurality of sample vessels in a predetermined order to complete the diluting and dispensing process, i.e., the pre-processing.

The present invention is characterized in that the injection of the sample and the diluent is performed based on the weight instead of being based on a volume like the related art. Since the volume of the liquid is changed according to a temperature by a liquid property, the volume is not appropriate to be used as a reference. Furthermore, since all workers may not read a scale of the vial based on the same reference, there is a limitation in consistency and accuracy. When the weight of the injection of the sample and the diluent is used as the reference like the present invention, the accuracy and the consistency in injection and dilution of the sample may be secured by automatic measurement of the scale.

Also, according to the present invention, since the dispensing and diluting of the samples of the plurality of sample vessels are automatically performed without manual operations, a plurality of samples for the ICP-AES analysis may be quickly pre-processed.

The sample diluting and dispensing device according to the present invention is characterized in that the injection of the sample and the diluent is performed based on the weight instead of being based on the volume like the related art. When the weight of the injection of the sample and the diluent is used as the reference, the accuracy and the consistency in injection and dilution of the sample may be secured by the automatic measurement of the scale.

Also, according to the present invention, since the dispensing and diluting of the samples of the plurality of sample vessels are automatically performed without manual operations, the plurality of samples for the ICP-AES analysis may be quickly pre-processed.

Although effects are not considered herein, the effects described in this specification and their provisional effects, which are expected by the technical features of the present invention, may be considered as the effects described in this specification.

Also, the preferred embodiments should be considered in descriptive sense only and not for purposes of limitation, and also the technical scope of the invention is not limited to the embodiments. Further, it will be understood that the protective scope of the present invention is not limited by obvious modifications or substitutions in the technical fields of the present invention.

What is claimed is:

1. A sample diluting and dispensing device comprising:
   a sample holding plate in which a holding part configured to hold a plurality of sample vessels is formed;
   a moving unit configured to transfer the sample holding plate in a plane direction and a height direction;
   a sample supply unit configured to supply a sample to the sample vessel;
   a diluent supply unit configured to supply a diluent to the sample vessel;
   a scale installed below the sample holding plate to measure a weight of the sample vessel; and
   a controller configured to receive a weight measurement result from the scale and control an operation of each of the sample holding plate, the sample supply unit, and the diluent supply unit.

2. The sample diluting and dispensing device of claim 1, wherein a plurality of through-holes are formed in the holding part of the sample holding plate,
   wherein the sample diluting and dispensing device further comprises a holding vessel configured to accommodate the sample vessel, the holding vessel inserted into and held by the through-hole, and
   a protruding part that protrudes from an outer circumferential surface of the holding vessel and caught and held by an outer portion of the through-hole when the holding vessel is inserted into the through-hole.

3. The sample diluting and dispensing device of claim 2, wherein the holding vessel has a flat bottom surface to stand itself when supported by the scale.

4. The sample diluting and dispensing device of claim 3, wherein when the sample holding plate descends, the holding vessel is supported by the scale to stand itself on the scale instead of being supported by the sample holding plate, and thus a weight of the holding vessel is measured.

5. The sample diluting and dispensing device of claim 2, wherein the scale comprises a scale main body and a support block installed on the scale main body and having a flat top surface to support the holding vessel.

6. The sample diluting and dispensing device of claim 1, wherein the sample supply unit comprises:
   a storage part configured to store the sample;
   an injection part configured to inject the sample of the storage part into the sample vessel and move between a standby position and an injection position for injecting the sample; and
   a pump configured to transfer the sample of the storage part to the injection part.

7. The sample diluting and dispensing device of claim 1, wherein the diluent supply unit comprises:
   a storage part configured to store the diluent;
   an injection part configured to inject the diluent of the storage part into the sample vessel and move between a standby position and an injection position for injecting the diluent; and
   a pump configured to transfer the diluent of the storage part to the injection part.

8. The sample diluting and dispensing device of claim 6, wherein the pump is a peristatic pump, and
   the sample diluting and dispensing device further comprises a transfer tube configured to connect the storage part and the injection part, the transfer tube inserted to the peristatic pump.

9. The sample diluting and dispensing device of claim 1, wherein the controller controls the sample diluting and dispensing device to perform:
   transferring the sample holding plate in the plane direction and the height direction, so that one of the plurality of sample vessels is supported on the scale;
   supplying a predetermined amount (mass) of the sample from the sample supply unit to the sample vessel while continuously measuring a weight by the scale; and
   supplying a predetermined amount (mass) of the diluent from the diluent supply unit to the sample vessel while continuously measuring a weight by the scale.

10. The sample diluting and dispensing device of claim 1, wherein the controller controls the sample diluting and dispensing device to perform a pre-processing on a plurality of samples by sequentially allowing each of the plurality of sample vessels to be supported individually on the scale and supplying the sample and the diluent.

* * * * *